United States Patent [19]
Akers

[11] Patent Number: 5,883,941
[45] Date of Patent: *Mar. 16, 1999

[54] HDSL AND POTS CARRIER SYSTEM

[75] Inventor: Francis I. Akers, San Mateo, Calif.

[73] Assignee: GoDigital Telecommunications, Fremont, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 747,068

[22] Filed: Nov. 8, 1996

[51] Int. Cl.⁶ .............................. H04M 11/00; H04J 3/12
[52] U.S. Cl. ..................... 379/93.08; 379/413; 370/468
[58] Field of Search ............................ 379/90.01, 93.01, 379/93.05, 93.11, 93.14, 93.15, 93.36, 93.37, 110.01, 410, 413, 399, 400; 370/468, 524, 535

[56] References Cited

U.S. PATENT DOCUMENTS

| | | | |
|---|---|---|---|
| 3,660,609 | 5/1972 | Tremblay et al. | 379/400 |
| 3,746,795 | 7/1973 | Fitzsimons et al. | 379/400 |
| 4,730,311 | 3/1988 | Carse et al. | 370/110.1 |
| 4,853,949 | 8/1989 | Schorr et al. | 379/2 |
| 5,140,630 | 8/1992 | Fry et al. | 379/179 |
| 5,247,347 | 9/1993 | Litteral et al. | 358/85 |
| 5,400,322 | 3/1995 | Hunt et al. | 370/19 |
| 5,410,343 | 4/1995 | Coddington et al. | 348/7 |
| 5,420,886 | 5/1995 | Ohmori | 375/258 |
| 5,436,895 | 7/1995 | Matsumoto | 370/60.1 |
| 5,440,335 | 8/1995 | Beveridge | 348/13 |
| 5,448,635 | 9/1995 | Biehl et al. | 379/399 |
| 5,450,486 | 9/1995 | Maas et al. | 379/399 |
| 5,459,729 | 10/1995 | Bliven | 370/112 |
| 5,528,281 | 6/1996 | Grady et al. | 348/7 |
| 5,596,604 | 1/1997 | Cioffi et al. | 345/260 |
| 5,598,413 | 1/1997 | Sansom et al. | 370/468 |
| 5,610,922 | 3/1997 | Balatoni | 379/410 |
| 5,621,731 | 4/1997 | Dale et al. | 370/79 |
| 5,657,381 | 8/1997 | Hughes-Hartogs | 379/100.12 |
| 5,668,814 | 9/1997 | Balatoni | 370/540 |
| 5,682,385 | 10/1997 | Garcia et al. | 370/458 |
| 5,787,088 | 7/1998 | Dagdeviren et al. | 370/493 |

FOREIGN PATENT DOCUMENTS

WO 96/29814  9/1996  European Pat. Off. ....... H04M 11/00

OTHER PUBLICATIONS

Article on "Bt8960 Single–Chip 2B1Q Transceiver", Mar. 1996.

ISDN–Network Interface Unit (I–NIU) Request for Quotation RFQ #N96 –NET–0049 Technical and Environmental Requirements.

"ISDN Basic Access Digital Subscriber Lines", Technical Reference TR–TSY–000393, Bellcore Communications Research (May 1988).

"ISDN Basic Access Transport System Requirements", Technical Advisory TA–TSY–000397, Bell Communications Research (Oct. 1986).

*Primary Examiner*—Wing F. Chan
*Attorney, Agent, or Firm*—Limbach & Limbach LLP; Seong-Kun Oh

[57] ABSTRACT

High-speed digital transmission can be achieved with existing phone lines and HDSL chipsets while retaining plain old telephone service (POTS) with full failsafe capability. One original digital data signal [4] at a rate of at least 352 kbps and typical 384 kbps and one POTS channel [10] digitized at 64 kbps are multiplexed by a HPCS card [6] of a signal provider [1]. The resulting digital signal is transported over a twisted pair based on the current technology. At a receiving end, the signal is demultiplexed and regenerated by a subscriber's HPCS card [7]. The subscriber's HPCS card is line-powered via the cable [2] to avoid dependence upon local power. The regenerated signals are transmitted over one POTS line [42] and one data line [8] to or within a remote premise. Both HPCS cards have bypass relays for the POTS line to ensure the subscriber's POTS access in the event of a local power outage or electronic failure.

33 Claims, 4 Drawing Sheets

HDSL AND POTS CARRIER SYSTEM

FIELD OF THE INVENTION

The field of the invention relates generally to high speed digital communication. More particularly, the field of the invention relates to transportation of one high speed digital signal and one POTS signal over one twisted cable pair from a front end and regeneration of the digital and POTS signals at a remote end.

BACKGROUND OF THE INVENTION

The recent growth of the Internet has created both a tremendous demand for additional subscriber access to public switched telephone networks (PSTN) and a demand for additional bandwidth for the access. The former demand is being met by deploying additional analog access lines so that modems can be used for the Internet access, and the latter demand is being met by deploying integrated service digital network (ISDN) lines. ISDN is the principal technology for placing a digital signal onto a copper pair that originally provides only analog dial tone, and it was developed in the 1980's, when state-of-the-art digital encoding technology resulted in the standards as described in Bellcore documents TR-TSY-000393 and TR-TSY-000397. The basic transmission rate, called BRI for ISDN is 160 kilobits per second (kbps). This digital rate and its corresponding communication method are called digital subscriber line (DSL).

In the case of modems, although the Internet access is provided, insufficient bandwidth limits the graphic service to still images which take seconds or minutes to download; while, in the latter case of ISDN, a subscriber's main standard plain old telephone service (POTS) line is not converted to ISDN in order to maintain the subscriber's POTS access in the event of a local power outage or electronic system failure because the ISDN service is dependent upon the residence power and proper function of the ISDN electronics; therefore, additional copper cable pairs need to be installed. In addition, the ISDN transmission with BRI only modestly increases the download speed of still images in comparison to modems. They can not provide the full graphic-rich service besides "jerky videos;" therefore, a transmission speed higher than BRI is desired.

In both cases, the installation of an additional copper-pair based access line is not financially viable for the telephone companies due to the long depreciation schedule for these cables. It is generally recognized that a higher-bandwidth media, such as fiber optic cable, is the ultimate solution for the digital access though the fiber connectivity precludes the lifeline access in the event of local power failures. While the technical and financial issues related to fiber installation are being worked out, installing copper cables only consumes capital and delays the day for fiberization.

One approach to avoid installing the additional copper pair cables is to more efficiently utilize existing phone lines for high-speed digital transmissions. The phone lines are made of twisted copper pairs and are configured in a star-like architecture that is suitable for bi-directional communications. The existing copper cable outside plant was constructed in accordance with design rules specifying that for local loops exceeding 13 kilo-ohms (k$\Omega$), or approximately 18 kilo-feet (kft) which is equivalent to 5,486 meters, loading coils or filter capacitors are added to remove voice frequencies shifted above 4 kilo-Hz (kHz) due to the loop resistance. The REA loop survey of 1986 indicates that for the US as a whole, approximately 15% of all loops are loaded. Since ISDN uses a digital signal operating at a center frequency of 40 kHz, it will not transmit in the presence of a load coil or capacitor. Bridged taps or branches attached to a primary cable run further reduce the reach of an ISDN signal over existing copper cables, with the net result being that approximately 70% of all existing subscribers can have ISDN service added without additional construction expenses, as reported by Pacific Bell in early 1996. But the question remains how the existing cables can be used to carry both a POTS signal and an ISDN signal with a transmission rate faster than BRI.

Since 1990, the performance of communication chipsets has significantly improved due to the development of microprocessors. High-bit-rate subscriber line (HDSL) chipsets can run at 784 kbps or 1 Mbps to transport one half of a T1/E1 digital loop carrier signal in an application called "Repeaterless T1/E1." Other types of high speed communication technologies for twisted pairs, such as asymmetric DSL (ADSL), are emerging from labs but are still too expensive for wide range applications.

HDSL technology, when reduced to a lower transmission speed than that in the T1 application, can be applied to transport one high speed digital signal and one POTS signal over the existing phone lines through multiplexing and demultiplexing, which can provide about 70% phone subscribers in the US for high speed Internet access while maintaining their old phone services without adding new twisted copper pairs or incurring any new expenses. This approach of multiplexing and demultiplexing was explored by several inventors in the past.

By way of example, Carse et al., U.S. Pat. No. 4,730,311 describe a multiplexer for use in a telephone system in which a plurality of subscriber locations are connected to a central office by a single subscriber loop. Carse et al. focus on the design of the multiplexer rather than the entire communication system. Their technique applies generally to any methods of digital transmission, consequently the transmission rate is arbitrary. The subscribers are defined to be locally powered and backed-up with battery power. The battery back-up can only last for a limited period of time in the case of local power loss. For the design of the multiplexer, Carse et al. do not define either a digital interface or standard of loopback testing. Also, the configuration of the central office is not described.

Litteral et al., U.S. Pat. No. 5,247,347 and Coddington et al., U.S. Pat. No. 5,410,343 define how to provide digital video signals from a video information provider to one or more of a plurality of subscriber premises. However, the multiplexers used in both systems mainly perform frequency domain multiplexing/demultiplexing which is inherently disadvantageous with respect to time domain multiplexing/demultiplexing. The power source of the multiplexers is not specified. In addition, Litteral et al. and Coddington et al. only describe transport and encoding of specific video signals rather than generic digital signals.

Bliven, U.S. Pat. No. 5,459,729 describes a method and apparatus for transmitting and receiving multiple telephone signals over a single twisted pair. Two conventional telephone signals are converted into one digital signal and then transported over a single twisted pair at a rate of 160 kbps. Creating a multiplicity of telephone channels in this way is sufficient for analog POTS but is too low to provide adequate Internet access.

Accordingly, it is a primary object of the present invention to provide a communication system that transports one high speed digital signal and a POTS channel over a single twisted cable pair, typified by the large non-loaded majority of the existing cable plant. It is a further object of the invention to provide line powering to a remote terminal to avoid dependence upon local power and to provide for a metallic POTS access in the event of electronic failures. This invention is subsequently referred to as a "HDSL and POTS carrier system" or abbreviated as "HPCS."

SUMMARY OF THE INVENTION

These and other objects and advantages are attained by connecting a signal provider to a signal subscriber through a twisted cable pair. The maximum length of the cable is approximately 16 kft depending upon the wire gauge, which offers roughly 1.2 kΩ loop resistance, from the signal provider to the signal subscriber, back to the signal provider. The signal provider comprises one HPCS card powered by a 48-Volt power supply. The HPCS card multiplexes one POTS channel and one digital channel at a transmission rate of 352 kbps or higher and then sends the resulted signal to the twisted cable pair. The components of the HPCS card comprise a transceiver, a digital interface module, a subscriber line interface (SLI) module, a bypass relay, and a utility microprocessor. The transceiver uses a 2B1Q transport mechanism and operates at a minimum rate of 416 kbps. The digital interface module connects to a high speed digital card for PSTN, Frame Relay, or Internet, such as a Class 5 switch or an Internet router or server. The bypass relay ensures the subscriber's POTS access in the event of an electronic failure. The utility microprocessor performs loopback testing in accordance with the National ISDN Standards.

The signal subscriber comprises a HPCS card, one POTS line, and one high speed data cable. The HPCS card connects the twisted cable pair to the high speed data cable and POTS line and is powered via the twisted cable pair. The components of the HPCS card contain a transceiver, a digital interface module, a SLI module, a bypass relay, and a utility microprocessor which are characterized by the same structure as those of the HPCS card of the signal provider. The high speed digital signal is provided to the subscriber at the remote premise in the form of an Ethernet, multiple ISDN BRI, or other standard high speed digital connection. The transmission rate of the high speed data line is at least 352 kbps. The SLI module supports a POTS loop with a normal resistance of 560 Ohms and provides five ringer equivalents.

DETAILED DESCRIPTION

Figure 1:
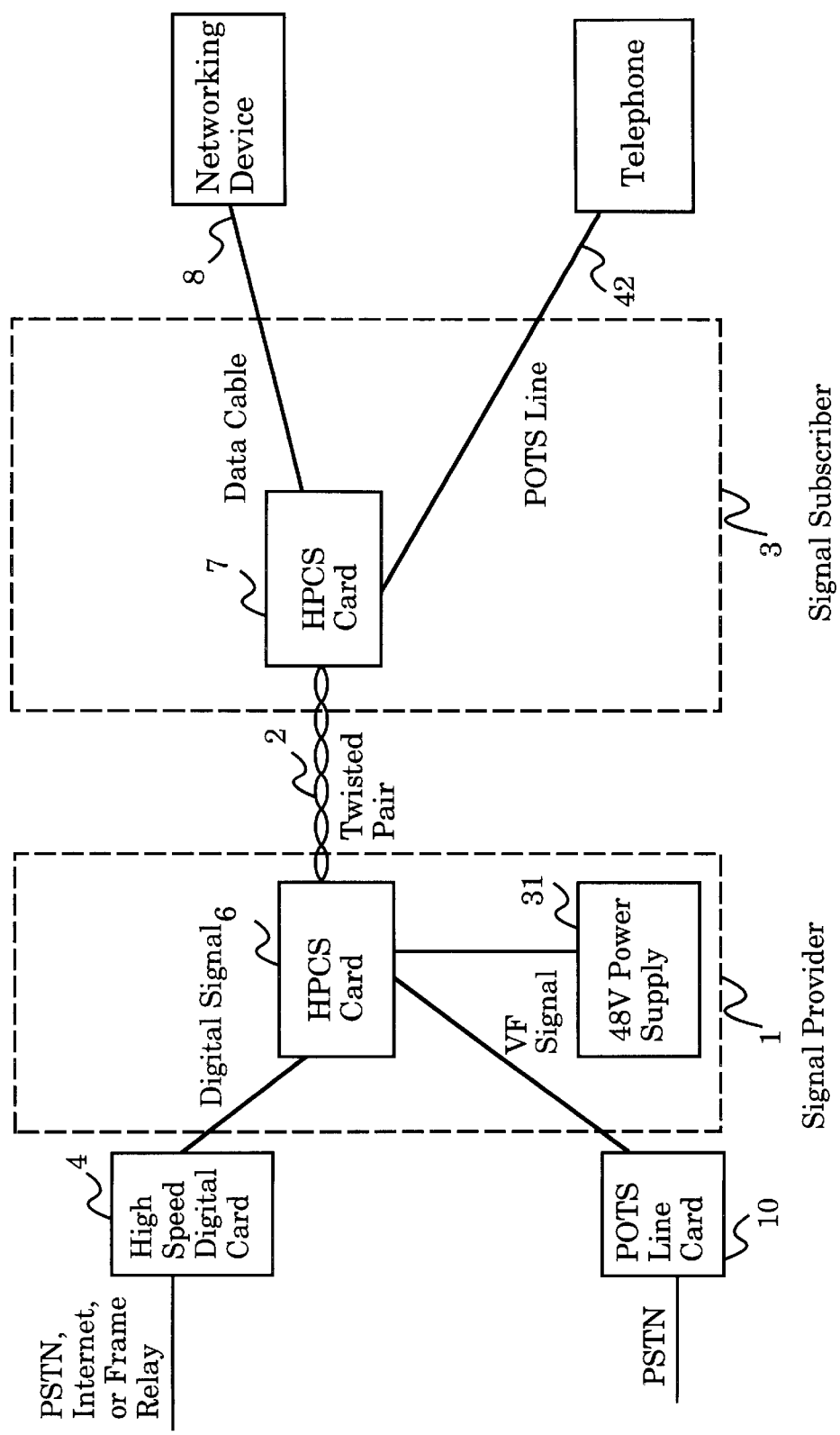
FIG. 1 is a schematic diagram of a high bit communication system with a single twisted cable pair.

A schematic diagram of an aspect of the invention is shown in FIG. 1. A signal provider 1 comprises a HPCS card 6 which connects a high speed digital card 4 and a POTS card 10 to a first end of a twisted cable pair 2. The HPCS card 6 is plugged into an equipment shelf, constituting a signal provider terminal. Through the high speed digital card 4, a digital signal of a minimum speed of 352 kbps and typically of 384 kbps is provided by either a switched or non-switched network. The digital and POTS signals are then multiplexed by the HPCS card 6, and the multiplexed signal is sent to a signal subscriber 3 over the twisted cable pair 2. The HPCS card 6 is powered by a 48-Volt power supply 31. Since the digital signal has a rate of at least 352 kbps and a digitized POTS channel occupies 64 kbps, the twisted cable pair 2 is required to provide a minimum speed of 416 kbps. The maximum length of the cable is limited by either the HPCS system's ability to transmit the powering voltage, or the signal processing ability of the digital encoding chip. For example, the BROOKTREE 8960 chip has an advertised reach of 16.5 kft. Both of these limitations are due to a combination of loop resistance, loop capacitance, and other signal attenuation and degrading influences. The reach of a digital system may be increased by removing bridged taps, or by renewing cable splices, or by replacing cables having water intrusion, so the system reach is not only variable but also controllable to some extent, depending on the value of providing the digital service to the customer. In summary, one practical limit of the reach of the system is the loop resistance which governs powering as well as signal. Given the state of the art in digital encoding, as exemplified by the BROOKTREE 8960 chip, 1.2 kΩ is roughly a practical limit, and this corresponds to approximately 16.5 kft on mixed 26 and 24 gauge cable plant. It is anticipated that the practical reach of the HPCS system may increase as improvements are made in subsequently available digital encoding chips which replace the BROOKTREE 8960. Similarly, if the loop is comprised of 24 AWG wire, the reach would exceed 20 kft.

The signal subscriber 3 contains a HPCS card 7, one POTS line 42, and one data cable 8. The HPCS card 7 is powered via the twisted cable pair 2. The amount of power which needs to be transmitted does not exceed 80 Volts on either wire in accordance with the U.S. safety standards. Internationally, the safety requirement for line-powering voltage varies and can go as low as 50 Volts on each wire. The digital signal transported over the twisted cable pair is demultiplexed and regenerated into one digital signal of at least 352 kbps and one POTS channel. The regenerated digital signal has the same signal quality and distance capability as the original one, and it is transmitted to or within a remote premise over the data cable 8. The POTS signal is sent to or within the remote premise over the POTS line 42.

Figure 2:
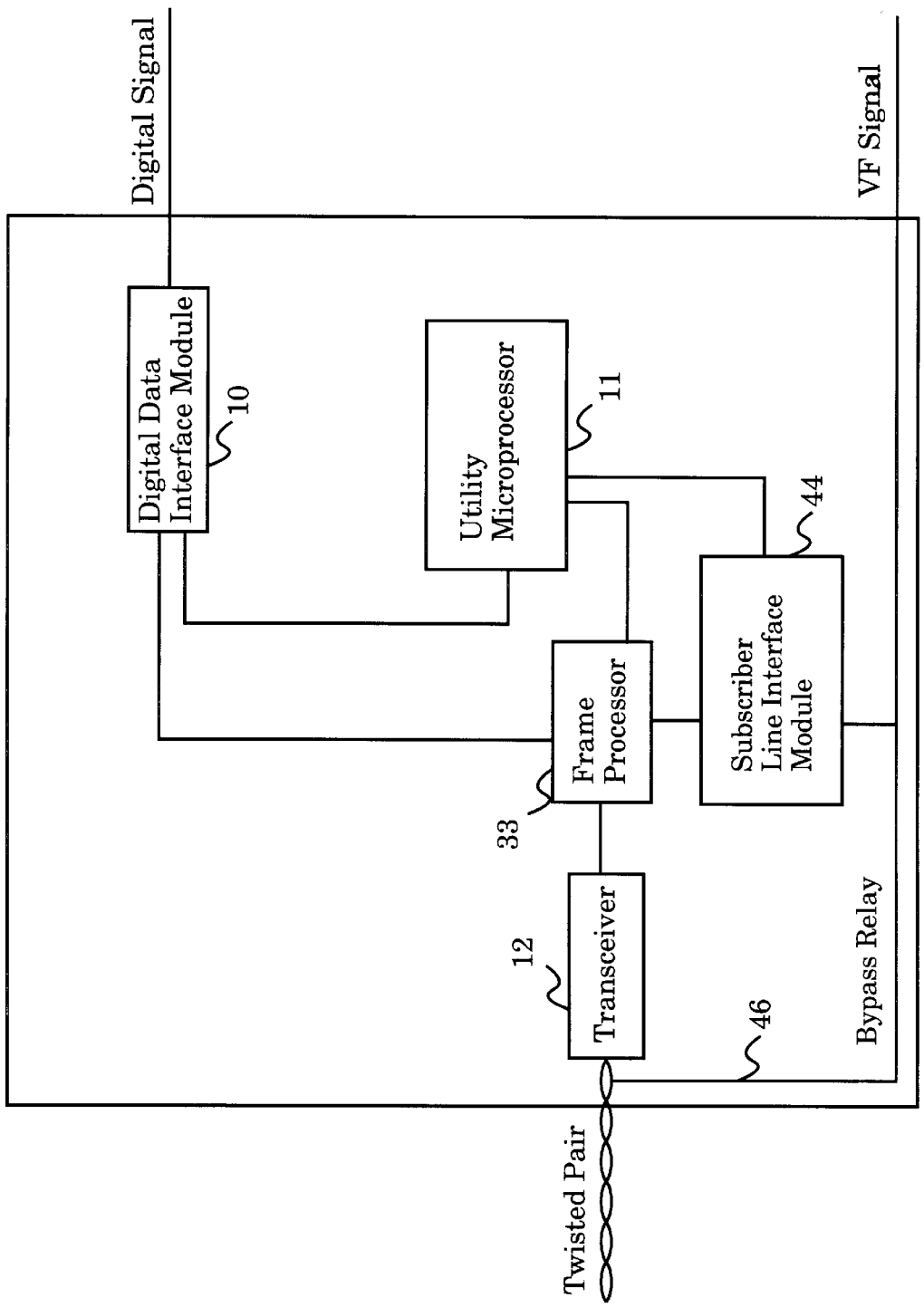
FIG. 2 is a simplified block diagram for the HPCS cards illustrated in FIG. 1.

Each of the HPCS cards 6 and 7 comprises a digital data interface module 10, a utility microprocessor 11, a transceiver 12, a SLI module 44, and a frame processor 33, as shown in FIG. 2. The digital data interface module 10 uses an Ethernet interface such as National DP8392, a PCI interface or other high speed data interfaces. The utility microprocessor 11 such as Motorola M68HC05 family provides loopback testing in accordance with the National ISDN Standards. The transceiver 12 uses a 2B1Q transport mechanism and operates at a speed of at least 416 kbps. One of such transceivers is Bt8960 DSL Transceiver by BROOKTREE Corporation with a transmission rate of 416 kbps in full duplex mode. The SLI module 44 in the HPCS card for the signal provider emulates a telephone set for signaling purposes and converts the analog POTS channel to a digital signal which is fed to the frame processor; while the SLI module for the signal subscriber converts the digitized POTS signal to analog and provides all standard functionality, such as ringing, off-hook detection, caller identification tones, and other features. The bypass relay 46 ensures the subscriber's POTS access in the event of a electronic failure or local power outage.

Figure 3:
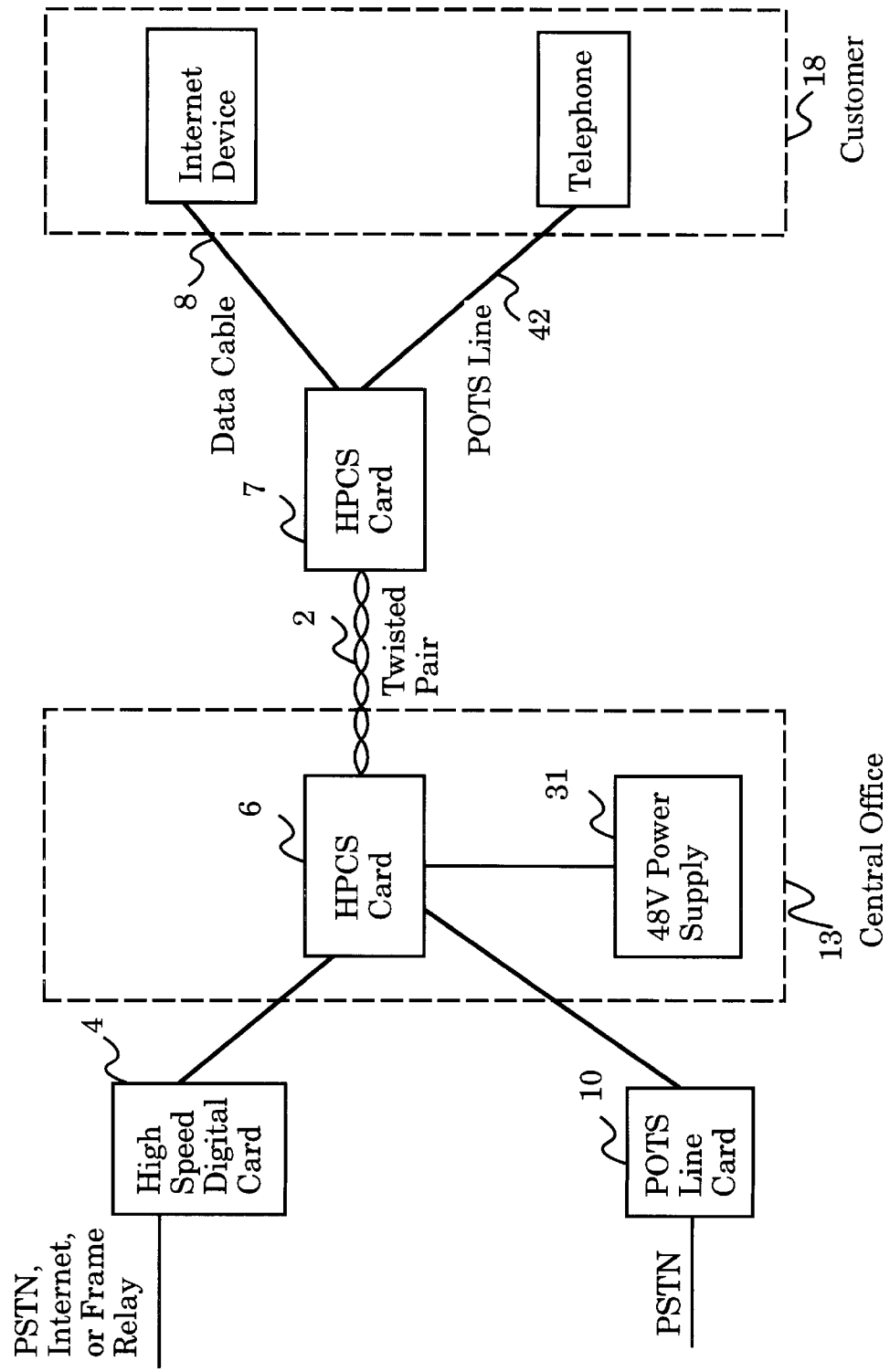
FIG. 3 is a schematic diagram according to an embodiment called office-to-house.

A first embodiment of the invention is an office-to-house system, as illustrated in FIG. 3. A HPCS card 7 is installed on a pole, on a house, or in a cabinet. A customer 18 has a high speed digital access and a POTS access. The POTS line is limited to a 560-Ohm loop including handset or about 2-kft-long on standard 24 AWG wire.

Figure 4:
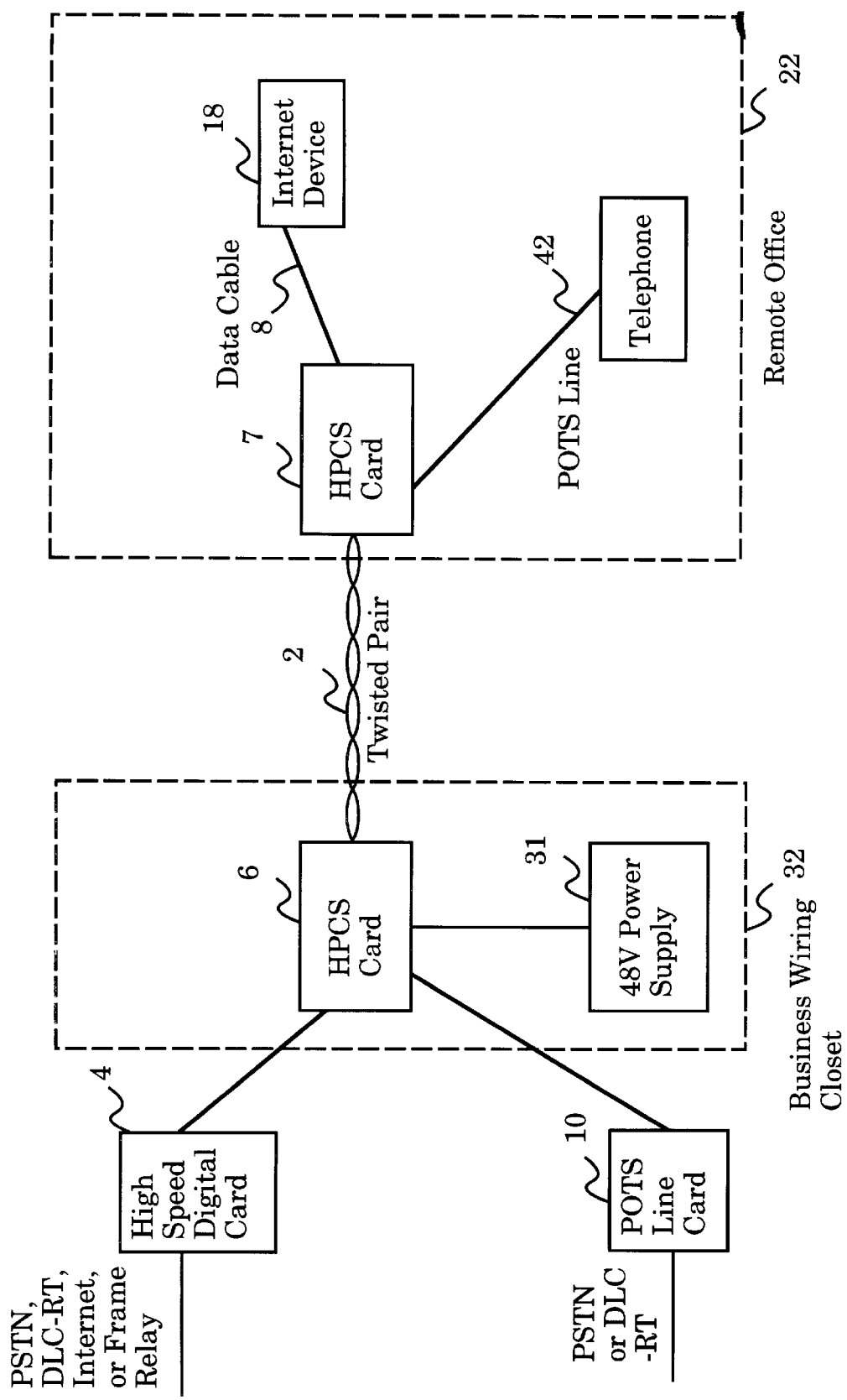
FIG. 4 is a schematic diagram according to an embodiment called corporate-intranet.

A second embodiment of the invention is a corporate-intranet system, as shown in FIG. 4. In this case, a corporate ISDN user needs a high speed data access at a remote office 22 whose location is not permanently fixed or which is wired with only one twisted pair. The twisted cable pair 2, normally used for POTS, is temporarily or permanently converted by adding a HPCS card 6 in a business wiring closet 32 and a HPCS card 7 in the remote office 22 to provide a data connection, in addition to the original POTS channel.

It will be clear to one skilled in the art that the above embodiments may be altered in many ways without departing from the scope of the invention. For example, more than one twisted cable pair can be used to transport more than one data signal and more than one POTS channel. The system can be used to transport solely high speed data without carrying any POTS channels. The transmission speed of the digital signal can be improved by utilizing higher speed HPCS cards. Accordingly, the scope of the invention should be determined by the following claims and their legal equivalents.

What is claimed is:

1. A high bit communication system, comprising:
   a) a single twisted cable pair with line-powering capability;
   b) a signal provider configured to multiplex one high speed digital signal having a transmission rate of at least 352 kbps and one POTS channel having a transmission rate of at least 64 kbps to connect a public switched telephone network to a first end of the twisted cable pair having a transmission rate of at least 416 kbps;
   c) a signal subscriber configured to receive said multiplexed signal from said signal provider along said single twisted cable pair at said transmission rate of at least 416 kbps, said signal subscriber further configured to demultinlex said multiplexed signal and accordingly, to generate and provide said high speed digital signal and said POTS channel at said respective transmission rates of at least 352 kbps and 64 kbps to a remote premise.

2. The high bit communication system of claim 1 wherein the single twisted cable pair is approximately 16 kft providing approximately 1.2 k$\Omega$ maximum loop resistance, from the signal provider to the signal subscriber, back to the signal provider.

3. The high bit communication system of claim 1 wherein said POTS channel is by default mechanically available to said subscriber in the event of either a local power loss or electronic failure.

4. The high bit communication system of claim 1 wherein the signal provider comprises one HPCS card which connects one high speed digital card and one POTS line card to the first end of said twisted cable pair.

5. The system of claim 4 wherein said high speed digital card is between a public switched telephone network and the HPCS card, between a frame relay network and the HPCS card, or between an Internet router or sever and the HPCS card.

6. The system of claim 4 wherein the HPCS card is powered with a 48-Volt power supply.

7. The system of claim 4 wherein the HPCS card comprises a transceiver, a frame processor, a digital interface module, a subscriber line interface module, a utility microprocessor, and a bypass relay.

8. The system of claim 7 wherein the transceiver connecting said twisted pair and said frame processor, uses a 2B1Q transport mechanism and transmits digital signals at a minimum rate of 416 kbps.

9. The system of claim 7 wherein the digital interface module is connected to said frame processor, said utility microprocessor, and one data cable extended from the digital interface module to said high speed digital card and uses one high speed data interface.

10. The system of claim 7 wherein the subscriber line interface module is connected to said frame processor, said utility microprocessor, and one POTS line extended from said POTS card interfaced to the public switched telephone network.

11. The system of claim 7 wherein the utility microprocessor connects said frame processor to said digital data interface module and said subscriber line interface module.

12. The system of claim 7 wherein the utility microprocessor comprises a means for providing loopback testing in accordance with the National ISDN Standards.

13. The system of claim 7 wherein the bypass relay connects said twisted pair and the POTS line extended from said POTS card interfaced to the public switched telephone network.

14. The high bit communication system of claim 1 wherein the signal subscriber comprises one HPCS card, one data cable having a first end and a second end, and one POTS line having a first end and a second end.

15. The system of claim 14 wherein the HPCS card connects the second end of the twisted cable pair to the first ends of the data cable and POTS line.

16. The system of claim 14 wherein the HPCS card is powered via the twisted cable pair, and the line voltage does not exceed 160 Volts in total or 80 Volts per wire in accordance with the US safety standards.

17. The system of claim 14 wherein the HPCS card is powered via the twisted cable pair in accordance with the international safety standards, which vary and can go as low as 50 Volts on each wire.

18. The system of claim 14 wherein the HPCS card comprises a transceiver, a frame processor, a digital interface module, a subscriber line interface module, a utility microprocessor, and a bypass relay.

19. The system of claim 18 wherein the transceiver connects the twisted cable pair and said frame processor, uses a 2B1Q transport mechanism, and transmits digital signals at a minimum rate of 416 kbps.

20. The system of claim 18 wherein the digital interface module connects said frame processor, said utility microprocessor, and said first end of said data cable, and uses one high speed digital interface.

21. The system of claim 18 wherein the subscriber line interface module is connected to said frame processor, said utility microprocessor, and the first end of said POTS line.

22. The system of claim 18 wherein the subscriber line interface module supports a local loop of up to 530-Ohm resistance with five ringer equivalents.

23. The system of claim 18 wherein the utility microprocessor connects said frame processor to said digital data interface module and said subscriber line interface module.

24. The system of claim 18 wherein the utility microprocessor is adapted to provide for loopback testing in accordance with the National ISDN Standards.

25. The system of claim 18 wherein the bypass relay connects said twisted pair and the first end of said POTS line.

26. The system of claim 14 wherein said data cable and said POTS line connect the HPCS card to a remote premise.

27. The system of claim 14 wherein the data cable has a transmission rate of at least 352 kbps.

28. The system of claim 14 wherein the POTS line has a maximum length of 2 kft which corresponds to a loop resistance of 130 Ohms.

29. A high bit communication system, comprising:
a single twisted cable pair having a transmission rate of at least 416 kbps;
a signal provider configured to multiplex a high speed digital signal having a transmission rate of at least 352 kbps and a POTS channel having a transmission rate of at least 64 kbps to connect a public switched telephone network to a first end of said single twisted cable pair, said signal provider including a first HPCS card configured to coupled a high speed digital card and a POTS line card to said first end of said twisted cable pair, said first HPCS card including a first transceiver; and
a signal subscriber configured to receive said multiplexed signal from said signal provider along said single twisted cable pair at said transmission rate of at least 416 kbps, said signal subscriber further configured to demultiplex said multiplexed signal and accordingly, to generate and provide said high speed digital signal and said POTS channel at said respective transmission rates of at least 352 kbps and 64 kbps to a remote premise, said signal subscriber including a second HPCS card configured to be powered via said single twisted cable pair, said second HPCS card including a second transceiver;
wherein said first and second transceivers are configured to use a 2B1Q transport mechanism for transmitting digital signals at a transmission rate of at least 416 kbps.

30. The system of claim 29 wherein said single twisted cable pair transmission rate is 448 kbps, said high speed digital signal transmission rate is 384 kbps, and further, wherein said 2B1Q transport mechanism of said first and second transceivers is configured to transmit digital signals at a transmission rate of 448 kbps.

31. The system of claim 29 further including a data cable and a POTS line each coupled to said signal subscriber,
wherein said data cable has a transmission rate of at least 352 kbps and is configured to receive said high speed digital signal from said signal subscriber, and further,
wherein said POTS line has a length of 2 kft and is configured to receive said POTS channel.

32. A method of transmitting a high speed digital signal and a POTS channel, said method comprising the steps of:
multiplexing a high speed digital signal having a transmission rate of at least 352 kbps and a POTS channel having a transmission rate of at least 64 kbps to generate a multiplexed signal;
providing said multiplexed signal to a single twisted cable pair for transmission at a rate of at least 416 kbps; and
receiving said multiplexed signal via said single twisted cable pair and demultiplexing said multiplexed signal to generate and provide said high speed digital signal and said POTS channel at said respective transmission rates of at least 352 kbps and 64 kbps to a remote premise.

33. The method of claim 32 wherein said high speed digital signal transmission rate is 384 kbps and wherein said single twisted cable pair transmission rate is 448 kbps.

* * * * *

UNITED STATES PATENT AND TRADEMARK OFFICE
CERTIFICATE OF CORRECTION

PATENT NO. : 5,883,941
DATED : March 16, 1999
INVENTOR(S) : Francis I. Akers

It is certified that error appears in the above-identified patent and that said Letters Patent is hereby corrected as shown below:

In Col. 5 Line 43, please change "demultinlex" to --demultiplex--.

Signed and Sealed this

Third Day of August, 1999

Q. TODD DICKINSON

*Attest:*

*Attesting Officer*　　　*Acting Commissioner of Patents and Trademarks*